US012486360B2

(12) United States Patent
Jeol et al.

(10) Patent No.: US 12,486,360 B2
(45) Date of Patent: Dec. 2, 2025

(54) POWDERED MATERIAL (P) CONTAINING POLYAMIDE (PA) POLYMER AND ITS USE FOR ADDITIVE MANUFACTURING

(71) Applicant: Syensqo Specialty Polymers USA, LLC, Alpharetta, GA (US)

(72) Inventors: Stéphane Jeol, Saint-Genis-Laval (FR); Arthur Bertrand, Communay (FR); Véronique Bossennec, Serezin-du-Rhône (FR)

(73) Assignee: Syensqo Specialty Polymers USA, LLC, Alpharetta, GA (US)

( * ) Notice: Subject to any disclaimer, the term of this patent is extended or adjusted under 35 U.S.C. 154(b) by 56 days.

(21) Appl. No.: 18/258,629

(22) PCT Filed: Dec. 15, 2021

(86) PCT No.: PCT/EP2021/085802

§ 371 (c)(1),
(2) Date: Jun. 21, 2023

(87) PCT Pub. No.: WO2022/136040

PCT Pub. Date: Jun. 30, 2022

(65) Prior Publication Data

US 2024/0052100 A1 Feb. 15, 2024

(30) Foreign Application Priority Data

Dec. 21, 2020 (EP) .................................... 20306627

(51) Int. Cl.

| | |
|---|---|
| ***B33Y 10/00*** | (2015.01) |
| ***B33Y 70/00*** | (2020.01) |
| ***C08G 69/26*** | (2006.01) |
| ***C09D 177/06*** | (2006.01) |
| *B29C 64/153* | (2017.01) |
| *B29K 77/00* | (2006.01) |

(52) U.S. Cl.

CPC .............. *C08G 69/26* (2013.01); *B33Y 70/00* (2014.12); *C09D 177/06* (2013.01); *B29C 64/153* (2017.08); *B29K 2077/00* (2013.01); *B33Y 10/00* (2014.12)

(58) Field of Classification Search

None

See application file for complete search history.

(56) References Cited

U.S. PATENT DOCUMENTS

| | | | | |
|---|---|---|---|---|
| 5,360,891 | A * | 11/1994 | Wenzel .................. | C08G 69/28 528/346 |
| 8,399,557 | B2 | 3/2013 | Montanari et al. | |
| 2015/0099847 | A1 | 4/2015 | Huelsmann et al. | |
| 2020/0010627 | A1 * | 1/2020 | Gramlich ............... | B33Y 40/00 |

OTHER PUBLICATIONS

Frank R. Prince et al.: "The Effect of Isomer Ratio on the Properties of Bis (4-aminocyclohexyl) methane Polyamides", Macromolecules, vol. 4, No. 3, May 1, 1971, pp. 347-350, XP055602289 (Year: 1971).*

Standard ISO 11357-3, "Plastics—Differential scanning calorimetry (DSC)—Part 3 : Determination of temperature and enthalpy of melting and crystallization", 2011, p. 1-10 (10 pages).

Prince Frank R. et al., "The Effect of Isomer Ratio on the Properties of Bis(4-aminocyclohexyl)methane Polyamides", Macromolecules, May 1, 1971 (May 1, 1971), vol. 4, No. 3, pp. 347-350 (4 pages).

International Search Report issued for corresponding international patent application No. PCT/EP2021/085802, mailed Mar. 24, 2022 (3 pages).

Written Opinion issued for corresponding international patent application No. PCT/EP2021/085802, mailed Mar. 24, 2022 (5 pages).

* cited by examiner

*Primary Examiner* — Mohammad M Ameen

(74) *Attorney, Agent, or Firm* — Osha Bergman Watanabe & Burton LLP

(57) ABSTRACT

The present invention relates to a process for manufacturing a three-dimensional (3D) article, part or composite material, from a powdered material (M) comprising a polyamide (PA) presenting 4,4'-diaminodicyclohexylmethane moieties, as well as to such powdered material (M). The present invention also relates to the 3D article, part or composite material obtainable from such process, as well as the use of the article, part or composite materials in oil and gas applications, automotive applications, electric and electronic applications, aerospace, medical and consumer goods.

16 Claims, No Drawings

POWDERED MATERIAL (P) CONTAINING POLYAMIDE (PA) POLYMER AND ITS USE FOR ADDITIVE MANUFACTURING

RELATED APPLICATIONS

This application is a national stage entry under 35 U.S.C. § 371 of International Application No. PCT/EP2021/085802 filed Dec. 15, 2021, which claims priority to European Application Number 20306627.9, filed on Dec. 21, 2020. The entire contents of these applications are explicitly incorporated herein by this reference.

TECHNICAL FIELD

The present invention relates to a process for manufacturing a three-dimensional (3D) article, part or composite material, from a powdered material (M) comprising a polyamide (PA) presenting 4,4'-diaminodicyclohexylmethane moieties, as well as to such powdered material (M). The present invention also relates to the 3D article, part or composite material obtainable from such process, as well as the use of the article, part or composite materials in oil and gas applications, automotive applications, electric and electronic applications, aerospace, medical and consumer goods.

BACKGROUND ART

Many objects, from household items to motor parts, are produced either from a single mass of material or they are milled or carved from a larger block of material. An alternative approach to manufacture objects is to deposit a thin layer of material, as a powder, and then add another layer on top, followed by another and another, and so on. This process of adding gave rise to the name additive manufacturing (AM), more commonly known as 3D printing. The range of specially designed 3D-printed products on the market is now considerable—from motor parts to dental implants. They can be notably manufactured using plastics. It is expected that additive manufacturing will disrupt established practices and overturn conventional assumptions about mass production in distant factories. Local fabrication in small volumes, or even of single items, close to the end user will become viable.

One of the fundamental limitations associated with known AM methods using polymeric part material in the form of a powder is based on the lack of identification of a material which presents the right set of properties in order to print 3D parts/objects with acceptable density and mechanical properties.

Powders of polyamides are used for manufacturing 3D articles. Mention can for example be made of polyamide 12 (PA12), polyamide 11 (PA11), and polyamide 6 (PA6). These polyamides advantageously have a melting temperature (Tm) lower than 280° C., and therefore have a much broader temperature window for their synthesis and processing in the melt, which first offers more flexibility in synthesis and processing, but also leads to printed parts with less colouring due to degradation. These polyamides however have a low glass transition temperatures (Tg), e.g. below 50° C., which make them unsuitable in applications requiring a high temperature resistance as their mechanical properties, such as modulus or strength, fall significantly above this temperature. For example, PA12 has a Tg of 40° C., PA11 has a Tg of 45° C. and PA6 has a Tg of 50° C. In addition, these polyamides require a drying step before being used.

There is therefore a need for polyamide powders having a higher Tg than the polyamide commercially available, so that they can be used to manufacture articles by 3D printing and be used in applications requiring a high temperature resistance, such as modulus and strength at temperature that are traditionally encountered in applications like automotive interior and exterior (up to 100° C.), and that does not drastically change with the humidity present in the environment. There is also a need for polyamide powder that absorb less moisture than commercially available polyamides. Such polyamide powders should also advantageously keep their low melting temperature (Tm), so as to minimize their thermal degradation during the typically long printing times.

The polyamide of the present invention is based on the condensation of a specific cycloaliphatic diamine, 4,4'-diaminodicyclohexylmethane (PACM), and at least one long chain aliphatic dicarboxylic acid. The applicant has indeed identified that polyamides derived from this combination of monomers present a high Tg temperature, and, at the same time, keep their low Tm, which make them well-suited to be 3D printed and used in applications requiring high temperature resistance. As described in Prince et al., Macromolecules 4(3): 347-350, 1971, such cycloaliphatic diamines exist in three different geometric configurations, i.e. trans/trans, cis/cis and cis/trans. In fact, the applicant has not only realised that such monomers are key to prepare polyamides with the above presented advantageous thermal properties (high Tg, low Tm), but also that only certain molar ratios of trans/trans isomers can actually lead to said improved thermal properties.

U.S. Pat. No. 5,360,891 (Huels) relates to a colorless and transparent, amorphously processable polyamide comprising the reaction product of I. a linear aliphatic dicarboxylic acid; II. a) 35-60 mol % of trans, trans-bis(4-aminocyclohexyl)-methane; and II. b) 65-40 mol % of other aliphatic, cycloaliphatic, araliphatic or aromatic diamines as starting components.

US 2015/0099847 (Evonik) relates to a composition, comprising a polyamide a blend of two polyamides wherein one of them is a polyamide having as copolymerized units bis(4-aminocyclohexyl)methane (PACM) and a linear dicarboxylic acid having from 8 to 18 C atoms.

U.S. Pat. No. 8,399,557 (Arkema) relates to a transparent blend or alloy comprising from 1 to 99 wt. % of a copolymer comprising two types of units: (A1) amide units, including at least one cycloaliphatic unit and (A2) flexible ether units, wherein the cycloaliphatic diamine or diamines can be chosen from bis(3-methyl-4-aminocyclohexyl) methane (BMACM), para-aminodicyclohexylmethane (PACM), isophoronediamine (IPD), bis(4-aminocyclohexyl) methane (BACM), 2,2-bis(3-methyl-4-aminocyclohexyl) propane (BMACP) or 2,6-bis(aminomethyl)norbornane (BAMN).

None of these three documents describe the use of such polyamide, in powder form, for manufacturing a 3D object using 3D printing.

DISCLOSURE OF THE INVENTION

Disclosed herein are powdered materials (M), as well as a process for manufacturing a 3D object (i.e. article, part or composite material) from such powdered materials (M) comprising at least one polyamide (PA) polymer comprising repeat units ($R_{PA}$) according to formula (I):

(I)

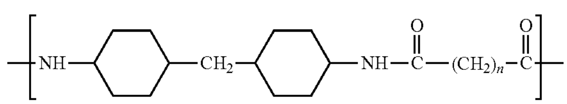

wherein n varies between 7 and 30, preferably between 11 to 18, even more preferably between 12 and 16, and at least 30 mol. % of the 4,4'-diaminodicyclohexylmethane moiety is in a trans/trans configuration, based on the total number of moles of the 4,4'-diaminodicyclohexylmethane moiety in the PA, preferably at least 30 mol. % but less than 50 mol. %, more preferably between 30 and 50 mol. %, between 31 and 49 mol. % or between 32 and 48 mol. %.

The expression "n varies between 7 and 30" means that n may be equal to 7 or 30; in other words, in the present disclosure, the endpoints of the ranges are included in the claimed scope.

The powdered material (M) of the present invention comprises a polymeric component (P) (i.e. at least the PA described herein), and it may also comprise additional components, for example flow aids/agents (F) or additives (A).

The powdered material (M) of the present invention can have a regular shape such as a spherical shape, or a complex shape. The material (M) may be obtained by grinding/milling or dissolution/precipitation of the polymeric component (P) in the form of pellets or coarse powder.

In the present application:

any description, even though described in relation to a specific embodiment, is applicable to and interchangeable with other embodiments of the present disclosure;

where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components; any element or component recited in a list of elements or components may be omitted from such list; and any recitation herein of numerical ranges by endpoints includes all numbers subsumed within the recited ranges as well as the endpoints of the range and equivalents.

In a first aspect, the present invention relates to a process for manufacturing a three-dimensional (3D) article, part or composite material, comprising depositing successive layers of a powdered material (M) and selectively sintering each layer prior to deposition of the subsequent layer, for example by means of an electromagnetic radiation of the powder.

The additive manufacturing process of the present invention is preferably selected from the group consisting of selective laser sintering (SLS), High Speed Sintering (HSS), High Speed Laser Sintering (HSLS), composite-based additive manufacturing technology ("CBAM") or multi jet fusion (MJF).

The additive manufacturing process usually takes place using a 3D printer.

SLS 3D printers are, for example, available from EOS Corporation under the trade name EOSINT® P or from 3D Systems under the trade name ProX or sPro.

MJF 3D printers are, for example, available from Hewlett-Packard Company under the trade name Multi Jet Fusion.

The powdered material (M) may also be used to produce fiber composites in a CBAM process, for example as developed by Impossible Objects.

According to an embodiment, the step of printing layers comprises the selective sintering of the powdered material (M) by means of an electromagnetic radiation of the powdered material (M), for example a high power laser source such as an electromagnetic beam source.

The 3D object/article/part may be built on substrate, for example a horizontal substrate and/or on a planar substrate. The substrate may be moveable in all directions, for example in the horizontal or vertical direction. During the 3D printing process, the substrate can, for example, be lowered, in order for the successive layer of unsintered polymeric material to be sintered on top of the former layer of sintered polymeric material.

In some embodiments, the process further comprises a step consisting in producing a support structure. According to such embodiments, the 3D object is built upon the support structure and both the support structure and the 3D object are produced using the same AM method. The support structure may be useful in multiple situations. For example, the support structure may be useful in providing sufficient support to the printed or under-printing, in order to avoid distortion of the shaped 3D object, especially when this 3D object is not planar. This is particularly true when the temperature used to maintain the printed or under-printing, 3D object is below the re-solidification temperature of the polymeric component, e.g. the polyamide.

The 3D printer may comprise a sintering chamber and a powder bed, both maintained at determined at a specific temperature.

The powdered material (M) to be printed can be preheated to a processing temperature (Tp) below the melting temperature (Tm). Tp may be below or above the glass transition (Tg) temperature of the powder. As an example, in some embodiments of the present invention, the powdered material (M) is heated, for example in the powder bed of a SLS printer, prior to the sintering of a selected area of the powder layer (for example, by means of an electromagnetic radiation of the powder), at a processing temperature (Tp) which is Tp<Tg+40, where Tg is the glass transition temperature of the PA polymer. The preheating of the powdered material (M) makes it easier for the laser to raise the temperature of the selected regions of layer of unfused powder to the melting point. The laser causes fusion of the material only in locations specified by the input. Laser energy exposure is typically selected based on the polymer in use and to avoid polymer degradation.

According to a second aspect of the present invention, the present invention relates to a powdered material (M) itself. Such powdered material (M) is suitable for additive manufacturing (AM) and may notably be used for 3D printing. It may also be used in coatings or as composite tougheners.

The powdered material (M) of the present invention comprises at least one polymeric component (P), i.e. at least one PA. The polymeric component (P) of the powdered material (M) may in fact comprise one or several PA as described below. It may also comprise at least one additional polymeric material, that-is-to-say at least one polymer or copolymer, distinct from the PA polymer described herein. This additional polymeric material may for example be selected from the group consisting of poly(arylene sulphide) (PAS) polymers, for example homopolymer of poly(phenylene sulphide) (PPS) polymer, poly(aryl ether sulfone) (PAES) polymers, for example a poly(biphenyl ether sulfone) (PPSU) polymer or a polysulfone (PSU) polymer, and poly(aryl ether ketone) (PAEK) polymers, for example a poly(ether ether ketone) (PEEK) polymer. This additional polymeric material may also be a polyamide (PA*) distinct from the PA described herein, for example a PA6, a PA 66, a PA11 or a PA12.

The PA described herein comprises repeat units ($R_{PA}$) according to formula (I):

(I)

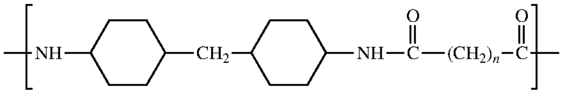

wherein n varies between 7 and 30, preferably between 11 to 18, even more preferably between 12 and 16, for example n equals 14, at least 30 mol. % of the 4,4'-diaminodicyclohexylmethane moiety is in a trans/trans configuration, based on the total number of moles of the 4,4'-diaminodicyclohexylmethane moiety in the PA, preferably at least 30 mol. % but less than 50 mol. %, more preferably between 30 and 50 mol. %, between 31 and 49 mol. % or between 32 and 48 mol. %.

Accordingly, the polyamide (PA) of the present disclosure may be a homopolyamide consisting essentially in repeat units ($R_{PA}$) or a copolyamide (PA) comprising repeat units ($R_{PA}$) and repeat units ($R^*_{PA}$), distinct from repeat units ($R_{PA}$). More precisely, the expression "polyamide" is hereby used for designating homopolyamides, as well as copolyamides, consisting in or comprising repeat units ($R_{PA}$), for example derived from 4,4'-diaminodicyclohexylmethane (PACM) of formula (II):

(II)

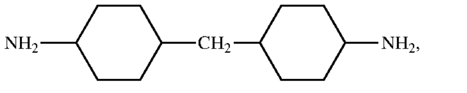

wherein at least 30 mol. % of the PACM is in a trans/trans configuration, based on the total number of moles of PACM in the reaction mixture, and a diacid of formula (III):

(III)

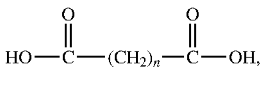

wherein n varies between 7 and 30, preferably between 11 to 18, even more preferably between 12 and 16. In formula (I) and (III), n is most preferably equals to 14.

For example, the PA of the present invention may comprise other repeat units ($R^*_{PA}$), and be arranged in blocks, in alternation or randomly.

According to an embodiment described herein, the PA consists of, or consists essentially of, repeat units ($R_{PA}$). The expression "consists essentially of" means that the PA comprises repeat units ($R_{PA}$), as well as less than 10 mol. %, preferably less than 5 mol. %, more preferably less than 3 mol. %, even more preferably less than 1 mol. %, of other repeat units distinct ($R^*_{PA}$) from repeat units ($R_{PA}$), based on the total number of moles of repeat units ($R_{PA}$)+($R^*_{PA}$) in the PA polymer.

When the polyamide (PA) comprises repeat units ($R^*_{PA}$), the repeat unit ($R^*_{PA}$) may for example be according to formula (IV) and/or formula (V):

(IV)

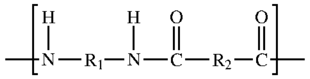

(V)

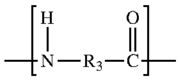

wherein $R_1$ is selected from the group consisting of a bond, a $C_1$-$C_{15}$ alkyl and a $C_6$-$C_{30}$ aryl, optionally comprising one or more heteroatoms (e.g. O, N or S) and optionally substituted with one or more substituents selected from the group consisting of halogen (e.g. fluorine, chlorine, bromine or iodine), hydroxy (—OH), sulfo (—$SO_3M$) (e.g. wherein M is H, Na, K, Li, Ag, Zn, Mg or Ca), $C_1$-$C_6$ alkoxy, $C_1$-$C_6$ alkylthio, $C_1$-$C_6$ acyl, formyl, cyano, $C_6$-$C_{15}$ aryloxy and $C_6$-$C_{15}$ aryl;

$R_2$ is selected from the group consisting of a $C_1$-$C_{20}$ alkyl and a $C_6$-$C_{30}$ aryl, optionally comprising one or more heteroatoms (e.g. O, N or S) and optionally substituted with one or more substituents selected from the group consisting of halogen (e.g. fluorine, chlorine, bromine or iodine), hydroxy (—OH), sulfo (—$SO_3M$) (e.g. wherein M is H, Na, K, Li, Ag, Zn, Mg or Ca), $C_1$-$C_6$ alkoxy, $C_1$-$C_6$ alkylthio, $C_1$-$C_6$ acyl, formyl, cyano, $C_6$-$C_{15}$ aryloxy and $C_6$-$C_{15}$ aryl; and $R_3$ is selected from the group consisting of a linear or branched $C_2$-$C_{14}$ alkyl, optionally comprising one or more heteroatoms (e.g. O, N and S) and optionally substituted with one or more substituents selected from the group consisting of halogen (e.g. fluorine, chlorine, bromine and iodine), hydroxy (—OH), sulfo (—$SO_3M$) (e.g. wherein M is H, Na, K, Li, Ag, Zn, Mg or Ca), $C_1$-$C_6$ alkoxy, $C_1$-$C_6$ alkylthio, $C_1$-$C_6$ acyl, formyl, cyano, $C_6$-$C_{15}$ aryloxy and $C_6$-$C_{15}$ aryl.

The polyamides (PA) of the present invention may have a number average molecular weight Mn ranging from 5,000 g/mol to 40,000 g/mol, for example from 72,000 g/mol to 35,000 g/mol or from 9,000 to 30,000 g/mol. The number average molecular weight Mn can be determined using the following equation (1):

$$Mn = \frac{2{,}000{,}000}{\sum_i [EG_i]} \qquad (1)$$

wherein $[EG_i]$ is the concentration of end-groups of the PA in mmol/kg, more precisely known methods to measure amine end-groups concentration and acid end groups-concentrations. The end-groups are moieties at respective ends of the PA polymer chain that are used to assess the number average molecular weight (Mn) of the PA polymer—in particular, by measuring the concentration of the end groups to determine the number of moles of PA in a given weight of sample. Depending on the possible use of an end-capping agent during the process, the PA may possess, for example, end-groups derived from the monomers and/or from end-capping agents. Frequently, PA is manufactured by a polycondensation reaction between a diamine and a diacid, so that the end groups generally include amine groups and acid groups; however, when an end-capping agent (such as benzoic acid or acetic acid) is used, the remaining amine groups may be at least partially converted into benzamide or acetamide end groups.

The concentration of amine and acid groups can be determined by potentiometric titration. Nevertheless, any suitable method may be used to determine the concentration of the end groups. For example, NMR may also be used.

In some embodiments, the PA is the condensation product of a reaction mixture comprising:

4,4'-diaminodicyclohexylmethane (PACM) of formula (II):

(II)

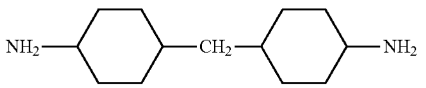

wherein at least 30 mol. % of the PACM is in a trans/trans configuration, based on the total number of moles of PACM in the reaction mixture, and a diacid of formula (III):

(III)

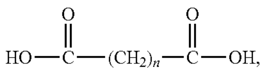

wherein n varies between 7 and 30, preferably between 11 to 18, even more preferably between 12 and 16, for example n equals 14.

In some preferred embodiments, the PA is the condensation product of a reaction mixture comprising:

at least one diamine component which contains at least 5 mol. % of 4,4'-diaminodicyclohexylmethane (PACM) of formula (II):

(II)

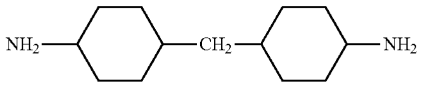

(or at least 10 mol. %, at least 15 mol. %, at least 20 mol. %, at least 25 mol. %, at least 30 mol. %, at least 35 mol. %, at least 40 mol. %, at least 45 mol. %, at least 50 mol. %, at least 55 mol. %, at least 60 mol. %, at least 65 mol. %, at least 70 mol. %, at least 75 mol. %, at least 80 mol. %, at least 85 mol. %, at least 90 mol. %, at least 95 mol. % or at least 98 mol. % of PACM), wherein at least 30 mol. % of the PACM is in a trans/trans configuration, based on the total number of moles of PACM in the reaction mixture, and at least one dicarboxylic acid component which contains at least 5 mol. % of a diacid of formula (III):

(III)

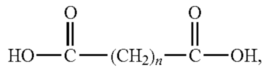

or derivative thereof, wherein n varies between 7 and 30, preferably between 11 to 18, even more preferably between 12 and 16, for example n equals 14, (or at least 10 mol. %, at least 15 mol. %, at least 20 mol. %, at least 25 mol. %, at least 30 mol. %, at least 35 mol. %, at least 40 mol. %, at least 45 mol. %, at least 50 mol. %, at least 55 mol. %, at least 60 mol. %, at least 65 mol. %, at least 70 mol. %, at least 75 mol. %, at least 80 mol. %, at least 85 mol. %, at least 90 mol. %, at least 95 mol. % or at least 98 mol. % of $HOOC—(CH_2)_n—COOH$).

The expression "derivative thereof" when used in combination with the expression "dicarboxylic acid" is intended to denote whichever derivative which is susceptible of reacting in polycondensation conditions to yield an amide bond. Examples of amide-forming derivatives include a mono- or di-alkyl ester, such as a mono- or di-methyl, ethyl or propyl ester, of such carboxylic acid; a mono- or di-aryl ester thereof; a mono- or di-acid halide thereof; a carboxylic anhydride thereof and a mono- or di-acid amide thereof, a mono- or di-carboxylate salt.

The PACM monomer of formula (II) is such that at least 30 mol. % of the monomer engaged in the polycondensation reaction is in a trans/trans configuration, based on the total number of moles of PACM engaged in the reaction. The inventors realised that such feature is key to prepare PA polymers with thermal properties which make them well-suited for additive manufacturing (3D printing), notably being hydrophobic and having a high glass transition temperature (preferably above 90° C.) and a low melting point (preferably below 255° C.) which ensures a good processing when printing, and advantageously differencing them from most of the commercially available polyamides, such as PA12 (Tg<50° C.), PA11 (Tg<50° C.) and PA6 (Tg<60° C., hydrophylic). The PA described herein also advantageously present a water uptake lower than 4 wt. %, which contributes to maintain a high glass transition temperature. In some embodiments, the PACM monomer of formula (II) is such that at least 30 mol. % of the monomer engaged in the polycondensation reaction, but less than 50 mol. %, is in a trans/trans configuration, based on the total number of moles of PACM engaged in the reaction, for example at least 31 mol. %, at least 32 mol. %, at least 33 mol. %, at least 34 mol. %, or at least 35 mol. %. In some embodiments, the PACM monomer of formula (II) is such that at most 50 mol. % of the monomer engaged in the polycondensation reaction is in a trans/trans configuration, based on the total number of moles of PACM engaged in the reaction, for example at most 49 mol. %, at most 48 mol. %, at most 47 mol. %, at most 46 mol. %, or at most 45 mol. %. In some embodiments, 40 mol. %±4 mol. % of the PACM monomer of formula (II) engaged in the polycondensation reaction is in a trans/trans configuration. In some other embodiments, 40 mol. %±3 mol. % of the PACM monomer of formula (II) engaged in the polycondensation reaction is in a trans/trans configuration.

The diacid of formula (III) may, for example, be chosen from the group consisting of nonadioic acid [$HOOC—(CH_2)_7—COOH$], decanedioic acid [$HOOC—(CH_2)_8—COOH$], undecanedioic acid [$HOOC—(CH_2)_9—COOH$], dodecanedioic acid [$HOOC—(CH_2)_{10}—COOH$], tridecanedioic acid [HOOC—$(CH_2)_{11}$—COOH], tetradecanedioic acid [HOOC—$(CH_2)_{12}$—COOH], pentadecanedioic acid [HOOC—$(CH_2)_{13}$—COOH], hexadecanedioic acid [HOOC—$(CH_2)_{14}$—COOH], heptadecanedioic acid [HOOC—$(CH_2)_{15}$—COOH], octadecanedioic acid [HOOC—$(CH_2)_{16}$—COOH] and nonadecandioic acid [HOOC—$(CH_2)_{17}$—COOH]. The diacid of formula (III) is preferably chosen from the group consisting of dodecanedioic acid, tridecanedioic acid, tetradecanedioic acid, pentadecanedioic acid, hexadecanedioic acid, heptadecanedioic acid and octadecanedioic acid; even more preferably tetradecanedioic acid, pentadecanedioic acid, hexadecanedioic acid, heptadecanedioic acid and octadecanedioic acid. More preferably, the diacid of formula (III) is hexadecanedioic acid.

The polyamide (PA) of the present invention may for example comprise at least 5 mol. % of repeat units ($R_{PA}$), for example derived from PACM as described above, and at least one dicarboxylic acid HOOC—$(CH_2)_n$—COOH, wherein n varies between 7 and 30, inclusive, for example at least about 10 mol. %, at least about 15 mol. %, at least about 20 mol. %, at least about 25 mol. %, at least about 30 mol. %, at least about 35 mol. %, at least about 40 mol. %, at least about 45 mol. %, at least about 50 mol. %, at least about 55 mol. %, at least about 60 mol. %, at least about 65 mol. %, at least about 70 mol. %, at least about 75 mol. %, at least about 80 mol. %, at least about 85 mol. %, at least about 90 mol. %, at least about 95 mol. % or at least about 98 mol. %.

The polyamide (PA) of the present disclosure may be a polyamide consisting essentially in repeat units ($R_{PA}$). In such case, the polyamide comprises less than 2 mol. % of repeat units distinct from repeat units ($R_{PA}$), for example less than 1 mol. %, less than 0.5 mol. % or even less than 0.1 mol. % of repeat units distinct from repeat units ($R_{PA}$).

In some embodiments, the PA is a copolyamide. In such case, the condensation mixture may further comprises at least one of component selected from the group consisting of:

- at least one dicarboxylic acid component or derivative thereof, and at least one diamine component,
- at least one aminocarboxylic acid, and/or
- at least one lactam.

According to these embodiments, the dicarboxylic acid component can be chosen among a large variety of aliphatic or aromatic components comprising at least two acidic moieties —COOH. According to this embodiment, the diamine component can be chosen among a large variety of aliphatic or aromatic components comprising at least two amine moieties —$NH_2$.

For example, the dicarboxylic acid component is selected from the group consisting of adipic acid, isophthalic acid, terephthalic acid, 2,6-naphthalene dicarboxylic acid, 4,4'-bibenzoic acid, 5-hydroxyisophthalic acid, 5-sulfophthalic acid, and mixture thereof, 1,4-cyclohexanedicarboxylic acid and the diamine component is selected from the group consisting of 1,4-diaminobutane, 1,5-diamonopentane, 2-methyl-1,5-diaminopentane, hexamethylene diamine, 1,9-diaminononane, 2-methyl-1,8-diaminooctoane, 1,10-diaminedecane, 1,12-dodecanediamine, m-xylylene diamine, p-xylylene diamine, $H_2N$—$(CH_2)_3$—O—$(CH_2)_2$—$O(CH_2)_3$—$NH_2$, bis(4-amino-3-methylcyclohexyl)methane (MACM), isophorone diamine (IPDA), bis(4-aminocyclohexyl)methane (MACM), and mixture thereof. The lactam may be selected from the group consisting of caprolactam, laurolactam and mixture thereof. The aminoacid may be selected from the group of 1,11-aminoundecanoic acid, 4-aminomethylcyclohexanoic acid.

The polyamide (PA) described herein can be prepared by any conventional method adapted to the synthesis of polyamides.

Preferentially, the polyamide of the invention is prepared by reacting by heating the monomers in presence of less than 40 wt. % of water, preferentially less than 30 wt. %, less than 20 wt. %, less than 10 wt. %, preferentially with no added water, up to a temperature of at least Tm+10° C., Tm being the melting temperature of the polyamide.

The polyamide (PA) described herein can advantageously be prepared by a solvent-free process, that-is-to-say a process conducted in the melt, in the absence of a solvent. When the condensation is solvent-free, the reaction can be carried out in equipment made from materials inert toward the monomers. In this case, the equipment is chosen in order to provide enough contact of the monomers, and in which the removal of volatile reaction products is feasible. Suitable equipment includes agitated reactors, extruders and kneaders.

The powdered material (M) of the present invention comprises one polymeric component (P) comprising at least one PA polymer as described above. The powdered material (M) of the present invention may consist essentially in one or several polymers, for example it may consist essentially in one PA polymer as described herein, or it may also comprise further components, for example a flow aid/agent (F), as described below, and/or one or several additives (A). When the powdered material (M) of the invention comprises additional components, they can be added or blended with the polymeric component described herein before, during or after the step of grinding.

The PA of the present invention is advantageously semi-crystalline. Preferably, the PA has a melting point (Tm) of at most 255° C., preferably of at most 250° C., more preferably of at most 240° C. or at most 235° C., when determined on the $2^{nd}$ heat scan in differential scanning calorimeter (DSC) according to ISO11357, using heating and cooling rates of 20° C./min.

The PA may have a melting point (Tm) of at least 180° C., preferably at least 190° C.

Preferably, the PA has a glass transition temperature (Tg) of at least 90° C., preferably of at least 100° C., more preferably of at least 110° C., when determined on the $2^{nd}$ heat scan in differential scanning calorimeter (DSC) according to ISO11357, using heating and cooling rates of 20° C./min.

The PA may have a glass transition temperature (Tg) of at most 170° C., at most 160° C.

According to an embodiment, the PA of the present invention has a water uptake at saturation, by immersion in water at 23° C. of less than 4 wt. %. According to this embodiment, the PA of the present invention may have for example a water uptake at saturation, by immersion in water at 23° C. of at less than 3.5 wt. %, less than 3.0 wt. %, or less than 2.5 wt. %. The water uptake at 23° C. can for example be determined by providing a specimen shaped according to ISO527 in its dry state (moisture content of less than 0.2 wt. %), immersing the same in deionized water at 23° C., until reaching a constant weight. The water uptake is calculated according to the formula:

$$\text{Water uptake} = \frac{W_{after} - W_{before}}{W_{before}} \times 100$$

wherein $W_{before}$ W is the weight of the shaped specimen in its original dry state and $W_{after}$ is the weight of the shaped specimen after water uptake.

In some embodiments of the present invention, the powdered material (M) has a $d_{90}$-value less than 150 μm, as measured by laser scattering in isopropanol. According to an embodiment, the powdered material (M) has a $d_{90}$-value less than 120 μm, as measured by laser scattering in isopropanol, preferably less than 110 μm or less 100 μm.

In some embodiments of the present invention, the powdered material (M) has a $d_{10}$-value higher than 0.1 μm, as measured by laser scattering in isopropanol. According to a preferred embodiment, the powdered material (M) has a $d_{10}$-value higher than 0.5 μm, as measured by laser scattering in isopropanol, preferably higher than 1 μm or higher than 2 μm.

In some embodiments of the present invention, the powdered material (M) has a $d_{50}$-value comprised between 5 μm and 80 μm, as measured by laser scattering in isopropanol, preferably between 7 μm and 75 μm, or between 9 μm and 70 μm or between 11 μm and 65 μm. A powdered material (M) with such particle size distribution is for example well-suited for selective laser sintering (SLS), toughening of composite materials and coatings.

In some embodiments of the present invention, the powdered material (M) has a $d_{99}$-value less than 195 μm, as measured by laser scattering in isopropanol. According to a preferred embodiment, the powdered material (M) has a $d_{99}$-value less than 190 μm, as measured by laser scattering in isopropanol, preferably less than 180 μm or less than 170 μm.

According to one embodiment, the powdered material (M) of the present invention comprises at least 50 wt. % of the polymeric component (P), for example at least 60 wt. % of the polymeric component (P), at least 70 wt. %, at least 80 wt. %, at least 90 wt. %, at least 95 wt. %, at least 98 wt. % or at least 99 wt. % of the polymeric component (P) described herein, based on the total weight of the powdered material (M).

According to one embodiment, the polymeric component (P) comprises at least 50 wt. % of the PA described herein, for example at least 60 wt. % of the PAS described herein, at least 70 wt. %, at least 80 wt. %, at least 90 wt. %, at least 95 wt. %, at least 98 wt. % or at least 99 wt. % of the PA described herein described herein, based on the total weight of the powder.

Additional components may notably be added to the polymeric component (P), before, during or after the step grinding of the polymeric component (P), notably the step grinding of the PA described herein, before the use of the powder for additive manufacturing. For example, the additional component may be a flow agent (F). This flow agent (F) may for example be hydrophilic. Examples of hydrophilic flow aids are inorganic pigments notably selected from the group consisting of silicas, aluminas and titanium oxide. Mention can be made of fumed silica. Fumed silicas are commercially available under the trade name Aerosil® (Evonik) and Cab-O-Sil® (Cabot). Fumed aluminas are commercially available under the trade name SpectraAl® (Cabot).

In one embodiment of the present invention, the powdered material (M) comprises from 0.01 to 10 wt. % of a flow agent (F), for example from 0.05 to 8 wt. %, from 0.1 to 6 wt. % or from 0.15 to 5 wt. % of at least one flow agent (F), for example of at least fumed silica or fumed alumina, based on the total weight of the powder.

These silicas or aluminas are composed of nanometric primary particles (typically between 5 and 50 nm for fumed silicas or aluminas). These primary particles are combined to form aggregates. In use as flow agent, silicas or aluminas are found in various forms (elementary particles and aggregates).

The powdered material (M) of the present invention may also comprise one or several additives (A), for example selected from the group consisting of fillers (such as carbon fibers, glass fibers, milled carbon fibers, milled glass fibers, glass beads, glass microspheres, wollastonite, silica beads, talc, calcium carbonates, colorants, dyes, pigments, lubricants, plasticizers, flame retardants (such as halogen and halogen free flame retardants), nucleating agents, heat stabilizers, light stabilizers, antioxidants, processing aids, fusing agents and electromagnetic absorbers. Specific examples of these optional additives (A) are titanium dioxide, zinc oxide, cerium oxide, silica or zinc sulphide, glass fibers, carbon fibers.

The powdered material (M) of the present invention may also comprise flame retardants, such as halogen and halogen free flame retardants.

In another embodiment of the present invention, the powdered material (M) comprises from 0.01 to 30 wt. % of at least one additive (A), for example from 0.05 to 25 wt. %, from 0.1 to 20 wt. % or from 0.15 to 10 wt. % of at least one additive (A), based on the total weight of the powder.

According to one embodiment, the powdered material (M) of the present invention comprises:

- at least 50 wt. % of the polymeric component (P),
- from 0.01 wt. % to 10 wt. %, from 0.05 to 8 wt. %, from 0.1 to 6 wt. % or from 0.15 to 5 wt. % of at least one flow agent (F), and
- optionally at least one additive (A), for example selected from the group consisting of fillers (such as carbon fibers, glass fibers, milled carbon fibers, milled glass fibers, glass beads, glass microspheres, wollastonite, silica beads, talc, calcium carbonates) colorants, dyes, pigments, lubricants, plasticizers, flame retardants (such as halogen and halogen free flame retardants), nucleating agents, heat stabilizers, light stabilizers, antioxidants, processing aids, fusing agents and electromagnetic absorbers, the % being based on the total weight of the powder.

In a third aspect, the present invention is directed to a process for producing the powdered material (M) for use in a method for a layer-wise manufacturing of a three-dimensional part, in which the fine powder is manufactured by:

- grinding from a coarse powder or granulate,
- a dissolution in a solvent of a coarse powder or granulate followed by a precipitation process from a solvent,
- an emulsification by extrusion of immiscible polymer blends and selective washing,
- extrusion of the polymer in the form of a filament of a low diameter and the filament cutting into small pieces,
- melt spraying or spray drying from a melt obtained from a coarse powder or granulate.

The powdered material (M) of the present invention may be obtained by a step of grinding the polymeric component (P), notably grinding the PA polymer described herein.

The powdered material (M), for example employed in the additive manufacturing process of the present invention, may also be obtained by:

Step 1') grinding the polymeric component (P), notably grinding the PA polymer described herein; and Step 2') blending the polymeric component (P) from Step 1') with the optional components, e.g. at least one flow agent (F).

The powdered material (M), for example employed in the additive manufacturing process of the present invention, may alternatively be obtained by:

Step 1") blending the polymeric component (P) with the optional components, e.g. at least one flow agent (F), and Step 2") grinding the blend from Step 1"), notably grinding the PAS polymer described herein.

The grinding step can take place in a pinned disk mill, a jet mill/fluidized jet mil with classifier, an impact mill plus classifier, a pin/pin-beater mill or a wet grinding mill, or a combination of those equipment. The temperature of the grinding step can be adjusted to facilitate the grinding. The grinding step can be done in presence an additive that cools down the temperature of the coarse or granulate or powder, such as dry ice, liquid nitrogen. The temperature of the coarse or granulate or powder before grinding can be below room temperature, below 0° C., below −20° C., below −50° C., or even below −100° C.

The ground powdered material can be separated or sieved, preferably in an air separator or classifier, to obtain a predetermined fraction spectrum. The powdered material (M) is preferably sieved before use in the printer. The sieving consists in removing particles bigger than 200 μm, than 150 μm, than 140 μm, 130 μm, 120 μm, 110 μm, or bigger than 100 μm, using the appropriate equipment.

The powdered material (M) may also be obtained by a process comprising the dissolution of the PA pellets/coarse powders in a solvent such as an mono hydroxyls like alcohol (ex: methanol, ethanol, propanol, butanol, and their stereoisomers . . . ) and polyhydroxyls such as glycols and followed by the precipitation controlled by a temperature control or by immersion in a non-solvent.

In a fourth aspect, the present invention relates to a three-dimensional (3D) article, part or composite material comprising the PA as described herein, obtainable from the additive manufacturing process of the present invention, and to the use of said article, part or composite material in oil and gas applications, automotive applications, electric and electronic applications, aerospace, medical and consumer goods.

With respect to automotive applications, said articles can be pans (e.g. oil pans), panels (e.g. exterior body panels, including but not limited to quarter panels, trunk, hood; and interior body panels, including but not limited to, door panels and dash panels), side-panels, mirrors, bumpers, bars (e.g., torsion bars and sway bars), rods, suspensions components (e.g., suspension rods, leaf springs, suspension arms), and turbo charger components (e.g. housings, volutes, compressor wheels and impellers), pipes (to convey for example fuel, coolant, air, brake fluid). With respect to oil and gas applications, said articles can be drilling components, such as downhole drilling tubes, metal protection liners and coatings, chemical injection tubes, undersea umbilicals and hydraulic control lines. Said articles can also be mobile electronic device components.

According to an embodiment, the composite material obtainable from the additive manufacturing process of the present invention is a continuous fibers reinforced thermoplastics composite. The fibers may be composed of carbon, glass or organic fibers such as aramid fibers.

In a fifth aspect, the present invention relates to the use of the powdered material (M) described herein, for the manufacture of a 3D object using additive manufacturing, preferably selective laser sintering (SLS), composite-based additive manufacturing technology ("CBAM") or multi jet fusion (MJF).

The invention will now be described with reference to the following examples, whose purpose is merely illustrative and not intended to limit the scope of the invention.

Experimental Section

Raw Materials

- PACM: 4,4'-methylene-bis-cyclohexylamine, 45-50 mol. % of trans/trans isomer, commercially available from BASF under the name Dicykan
- PACM*: 4,4'-methylene-bis-cyclohexylamine, 17-24 mol. % of trans/trans isomer, commercially available from Evonik under the name Vestamin® PACM
- C14 diacid: tetradecanedioic acid, commercially available from Cathay Biotech Inc
- C15 diacid: pentadecanedioic acid commercially available from Cathay Biotech Inc.
- C16 diacid: hexadecanedioic acid, commercially available from Cathay Biotech Inc.
- C18 diacid: octadecanedioic acid, commercially available from Elevance
- PA12: commercially available from Evonik
- PA6: commercially available from Domo Chemicals

Synthesis Example

Four polyamides were synthesized from melt polycondensation of PACM and either C14, C15, C16 or C18 dibasic acids.

Synthesis of PACM.16 (Inventive)

95.5 g (0.45 mol) of PACM, 128.4 g (0.44 mol) of C16 diacid, and 4.16 g of an aqueous solution of sodium hypophosphite monohydrate (5% wt, 2 mmol) were introduced in a stainless-steel reactor equipped with a mechanical stirrer. The reactor was purged with nitrogen, and the temperature in the reactor was gradually increased up to 275° C. The reaction proceeded at atmospheric pressure. Condensation water as well as water from the catalyst solution were distilled off. The reaction mixture was kept at 275° C. for 30 min. The resulting polymer was then discharged as a strand and pelletized.

Synthesis of PACM.14, PACM.15, PACM.18 (Inventive)

The same procedure than for PACM.16 was applied for the preparation of these polyamides.

Synthesis of PACM*.16 (Comparative)

The same procedure than for PACM.16 was applied for the preparation of this polyamide, except that a PACM with trans/trans isomer concentration of 17-24 mol. % was used (designated as PACM*).

Characterization of the Polymeric Component

Determination of the Mn by the End-Group Analysis

The end groups, amine end groups ($-NH_2$) and carboxylic acid end groups ($-COOH$), of the polyamides are determined by potentiometric titration and expressed in mmol/kg. The number average molecular weight is then determined by the equation (1) and expressed in g/mol The concentration of end-groups and respective calculated number average molecular weight (Mn) are respectively listed in Table 1 and 2 below.

TABLE 1

| Polymer | —$NH_2$ (mmol/g) | —COOH (mmol/g) |
|---|---|---|
| PACM.14 (inv) | 95 | 40 |
| PACM.15 (inv) | 105 | 38 |
| PACM.16 (inv) | 63 | 60 |
| PACM.18 (inv) | 55 | 36 |

DSC

DSC analyses were carried out on DSC 8000 (Perkin Elmer) according to ISO11357 and data was collected through a two heat, one cool method. The protocol used is the following: 1$^{st}$ heat cycle from 30.00° C. to 300.00° C. at 20.00° C./min; isothermal for 5 minutes; 1$^{st}$ cool cycle from 300.00° C. to 30.00° C. at 20.00° C./min; 2$^{nd}$ heat cycle from 30.00° C. to 300.00° C. at 20.00° C./min. The melting temperature ($T_m$) is recorded during the 1$^{st}$ and 2$^{nd}$ heat cycles, the melt crystallization temperature ($T_{mc}$) is recorded during the cool cycle, and the glass transition temperature ($T_g$) is recorded during the 2$^{nd}$ heat cycle.

Water Uptake

The polyamides specimen were shaped according to ISO527 in its dry state (moisture content of less than 0.2 wt. %), and then immersed in deionized water at 23° C., until reaching a constant weight. The water uptake is calculated according to the formula:

$$\text{Water uptake} = \frac{W_{after} - W_{before}}{W_{before}} \times 100$$

wherein $W_{before}$ is the weight of the shaped specimen in its original dry state and $W_{after}$ is the weight of the shaped specimen after water uptake.

Results

TABLE 2

| Example | Mn (kg/mol) | Tc (° C.) | Tm (° C.) | Tg (° C.) | Water uptake |
|---|---|---|---|---|---|
| PACM.14 (inv) | 14.9 | 171 | 233 | 131 | <4% |
| PACM.15 (inv) | 14.1 | 170 | 227 | 123 | <4% |
| PACM.16 (inv) | 16.2 | 167 | 229 | 125 | <4% |
| PACM.18 (inv) | 22.0 | 164 | 225 | 116 | <4% |
| PACM*.16 (comp) | — | None | None | 120 | — |
| PACM.6 (comp) | — | ND | 355 | 165 | — |
| PA12 (comp) | — | ND | 180 | 40 | 2% |
| PA6 (comp) | — | ND | 220 | 50 | 9% |

ND: not determined

As shown in Table 1, the PACM*.16 polymer, which results from the condensation of PACM* and C16 diacid, has not melting and crystallisation points. It is amorphous.

All the inventive polyamides advantageously present a water uptake of less than 4%.

Powder Preparation and Characterization

PACM.16 and PACM*.16 were turned into powders by milling on impact grinder (SPEX Certiprep 6850 Freezer/Mill) until they reach a PSD as follows:

5<$d_{50}$<80 microns and $d_{90}$<150 microns.

Particle size was determined on the polymers by an average of 3 runs via a laser scattering technique on a Malvern Mastersizer 3000 analyzer in wet mode (128 channels, between 0.0215 and 1408 μm). The solvent used was isopropanol with a refractive index of 1.38, with the particles assumed to have a refractive index of 1.59. The ultrasonic mode was enabled (25 W/60 seconds) and the flow was set at 55%.

The two powders were then heated to 200° C. (i.e. 20-30° C. below Tm, condition typically applied to the powder bed during additive manufacturing through SLS) for 15 hours under $N_2$.

After the lengthy thermal treatment, the powder bed of PACM*.16 has molten and a solid block is obtained upon cooling to 20° C. On the contrary PACM.16 visually remained powdery, and the powder can be easily dispersed through gentle stirring with a spatula. This demonstrates that very little particle aggregation occurred (i.e undesired sintering) which is essential to ensure shape accuracy during printing, easy removal of unused powder around the printed part, and reusability of the powder.

The invention claimed is:

1. A process for manufacturing a three-dimensional (3D) article, part or composite material, comprising:

a) depositing successive layers of a powdered material (M) comprising at least one polyamide (PA) polymer consisting of or consisting essentially of repeat units ($R_{PA}$) comprising a 4,4'-diaminodicyclohexylmethane moiety and according to formula (I):

(I)

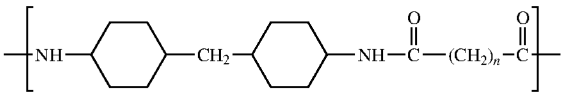

wherein n varies between 11 and 18, at least 30 mol. % of the 4,4'-diaminodicyclohexylmethane moiety is in a trans/trans configuration, based on the total number of moles of the 4,4'-diaminodicyclohexylmethane moiety in the PA, b) printing layers prior to deposition of the subsequent layer.

2. The process of claim 1, wherein step b) comprises selective sintering by means of an electromagnetic radiation of the powder.

3. The process of claim 1, wherein the PA is the condensation product of a reaction mixture comprising:

4,4'-diaminodicyclohexylmethane (PACM) of formula (II):

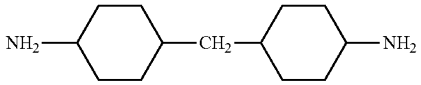

(II)

wherein at least 30 mol. % of the PACM is in a trans/trans configuration, based on the total number of moles of PACM in the reaction mixture, and a diacid of formula (III):

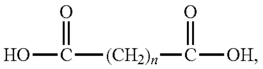

(III)

or derivative thereof, wherein n varies between 11 and 18.

4. The process of claim 1, wherein the PA is such that at least 30 mol. % and less than 50 mol. % of the 4,4'-diaminodicyclohexylmethane moiety is in a trans/trans configuration, based on the total number of moles of the 4,4'-diaminodicyclohexylmethane moiety in the PA.

5. The process of claim 1, wherein the PA has a melting point (Tm) of at most 255° C., when determined on the $2^{nd}$ heat scan in differential scanning calorimeter (DSC) according to ISO11357, using heating and cooling rates of 20° C./min.

6. The process of claim 1, wherein the PA has a glass transition temperature (Tg) of at least 90° C., when determined on the 2nd heat scan in differential scanning calorimeter (DSC) according to ISO11357, using heating and cooling rates of 20° C./min.

7. The process of claim 1, wherein the PA has a water uptake at saturation, by immersion in water at 23° C. of less than 4 wt. %.

8. The process of claim 1, wherein the PA is in a powder form, having a $d_{50}$-value ranging between 5 and 80 μm, as measured by laser scattering in isopropanol.

9. The process of claim 1, wherein the PA has a melting point (Tm) of at most 250° C., when determined on the $2^{nd}$ heat scan in differential scanning calorimeter (DSC) according to ISO11357, using heating and cooling rates of 20° C./min.

10. The process of claim 1, wherein the PA has a glass transition temperature (Tg) of at least 100° C., when determined on the $2^{nd}$ heat scan in differential scanning calorimeter (DSC) according to ISO11357, using heating and cooling rates of 20° C./min.

11. The process of claim 1, wherein the additive manufacturing is selected from selective laser sintering (SLS), composite-based additive manufacturing technology ("CBAM") or multi jet fusion (MJF).

12. The process of claim 1, wherein the PA has a melting point (Tm) of at most 255° C. and of at least 180° C., when determined on the $2^{nd}$ heat scan in differential scanning calorimeter (DSC) according to ISO11357, using heating and cooling rates of 20° C./min.

13. The process of claim 1, wherein the PA has a melting point (Tm) of at most 235° C. and of at least 190° C., when determined on the $2^{nd}$ heat scan in differential scanning calorimeter (DSC) according to ISO11357, using heating and cooling rates of 20° C./min.

14. The process of claim 1, wherein the PA has a glass transition temperature (Tg) of at least 90° C. and of at most 170° C., when determined on the $2^{nd}$ heat scan in differential scanning calorimeter (DSC) according to ISO11357, using heating and cooling rates of 20° C./min.

15. The process of claim 1, wherein the PA has a glass transition temperature (Tg) of at least 110° C. and of at most 160° C., when determined on the $2^{nd}$ heat scan in differential scanning calorimeter (DSC) according to ISO11357, using heating and cooling rates of 20° C./min.

16. The process of claim 1, wherein the powdered material has:

a $d_{10}$-value of higher than 0.1 μm, a $d_{50}$-value ranging between 5 and 80 μm, a $d_{90}$-value of less than 150 μm, and a $d_{99}$-value of less than 195 μm, as measured by laser scattering in isopropanol.

* * * * *